Sept. 23, 1958　　　F. E. AHLBIN　　　2,853,400
METHOD OF PROVIDING CUSHION COATINGS OF SKIN
SURFACED FOAMED PLASTISOL ON ARTICLES
AND THE COATED ARTICLES PRODUCED
Filed Oct. 27, 1955　　　　　　　　　4 Sheets-Sheet 1

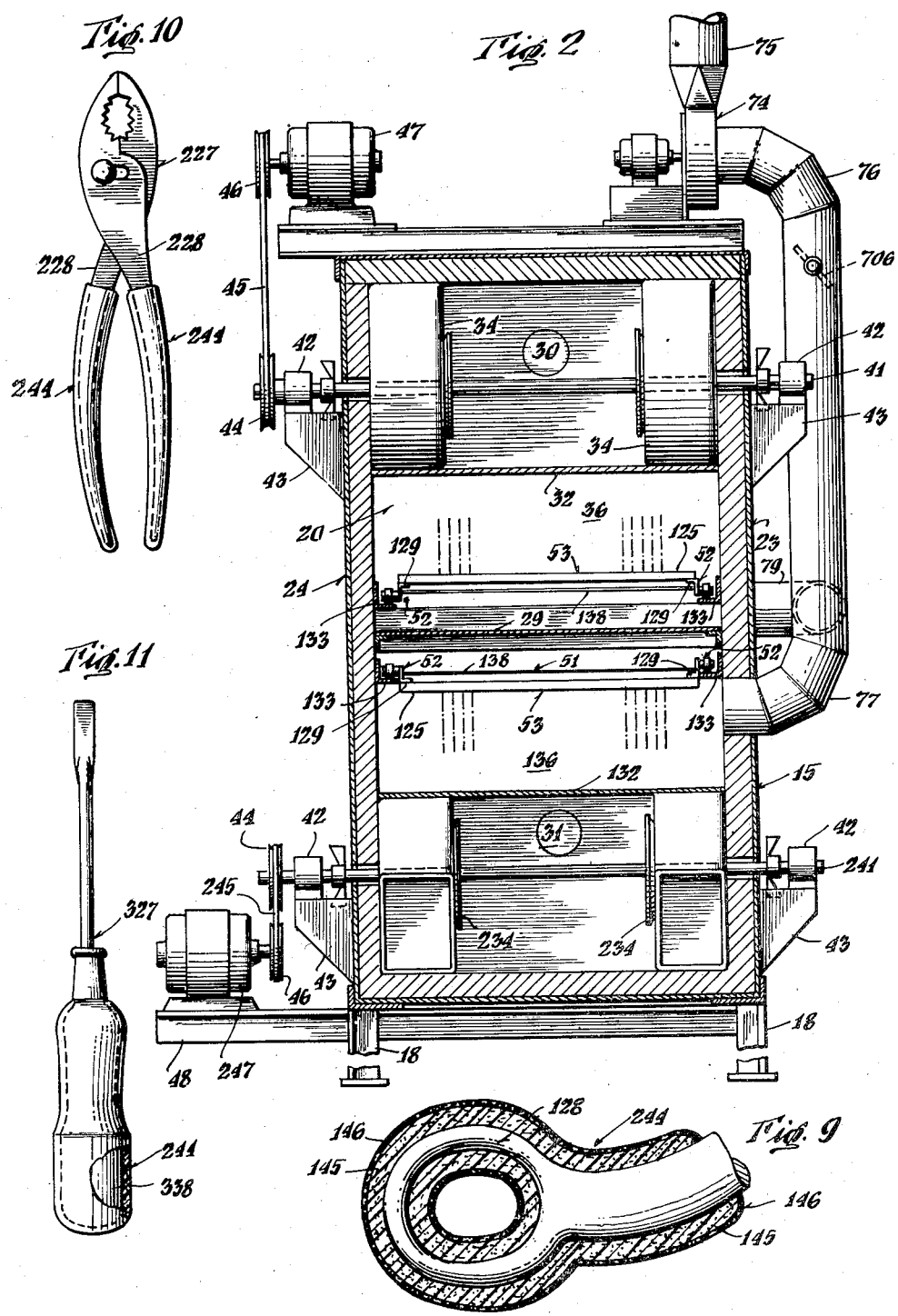

Sept. 23, 1958 F. E. AHLBIN 2,853,400
METHOD OF PROVIDING CUSHION COATINGS OF SKIN
SURFACED FOAMED PLASTISOL ON ARTICLES
AND THE COATED ARTICLES PRODUCED
Filed Oct. 27, 1955 4 Sheets-Sheet 3
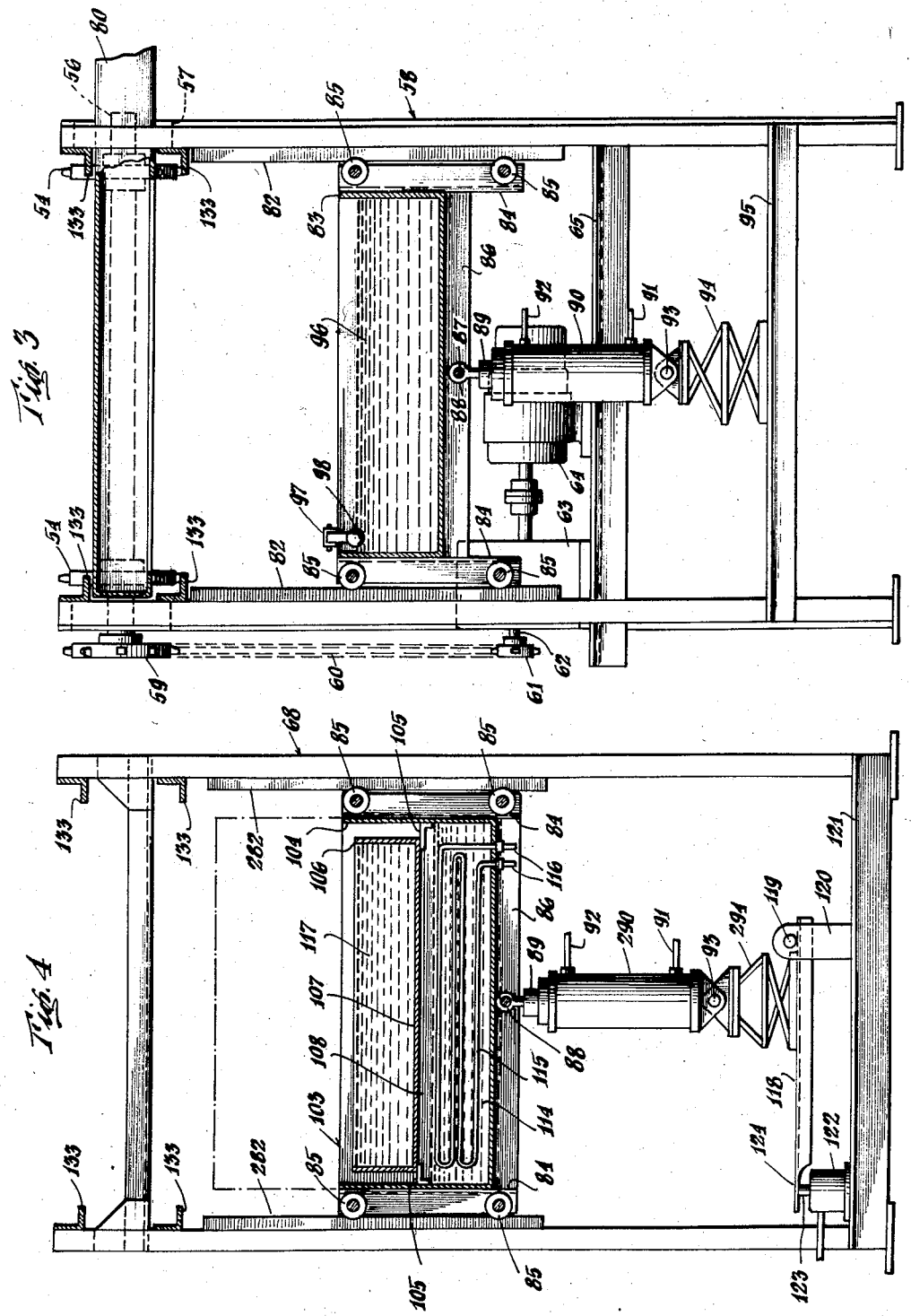

Sept. 23, 1958  F. E. AHLBIN  2,853,400
METHOD OF PROVIDING CUSHION COATINGS OF SKIN
SURFACED FOAMED PLASTISOL ON ARTICLES
AND THE COATED ARTICLES PRODUCED
Filed Oct. 27, 1955  4 Sheets-Sheet 4
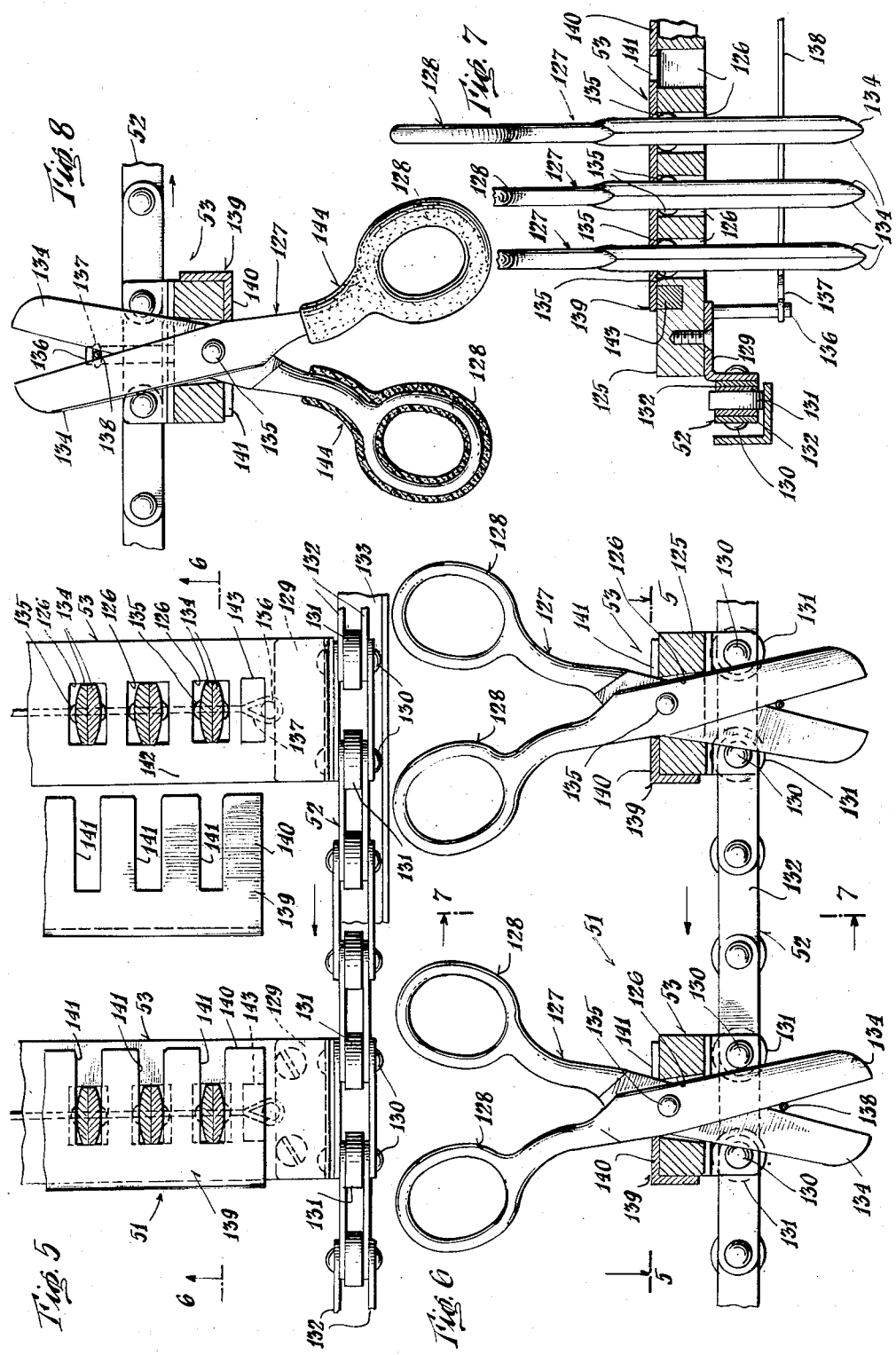

United States Patent Office 2,853,400
Patented Sept. 23, 1958

2,853,400

METHOD OF PROVIDING CUSHION COATINGS OF SKIN SURFACED FOAMED PLASTISOL ON ARTICLES AND THE COATED ARTICLES PRODUCED

Fred E. Ahlbin, Fairfield, Conn.

Application October 27, 1955, Serial No. 543,080

4 Claims. (Cl. 117—65)

The present invention relates to a method of applying to articles cushion coatings of foamed plastisol having a skin-surface and the coated articles produced by the practice of this procedure.

A general object of the present invention is to provide such a method which uniquely applies to surfaces of articles a layer of plastisol without the use of molds and subsequently foams the plastisol layer to form a cushion coating with simultaneous formation of a useful skin on the foamed coating; and the sponge-coated articles resulting therefrom of which, when intended for personal body contact, the foamed coatings will provide cushioning comfort, may serve as protective cushions, can be easily cleaned, may mask relatively rough unfinished surfaces and permit the use of attractive and identifying colors simply incorporated in the coatings.

A more specific object of the present invention is to provide such a method which permits simple application of the plastisol layer to article surfaces by dipping in a bath of flowable plastisol which includes a foaming agent and then releasing gas from the foaming agent to form a foamed coating with simultaneous curing of the outer surface of the foamed coating to provide a substantially liquid-impervious, easily cleaned skin thereon.

Another object of the present invention is to provide such a method in a form well suited to continuous operation wherein the articles are preferably preheated to adjust the temperature thereof and the heated articles are then dipped in a particular foaming agent-containing plastisol bath permitting ready formation of the skin-surfaced foamed coatings of predetermined thickness and other desired characteristics by subsequent heating.

A further object of the present invention is to provide tool and instrument handles, such as the handles of scissors and shears, with such skin-surfaced foamed plastisol coatings that assures secure gripping and comfortable grasp thereof while permitting when suitably pigmented attractive and identifying coloration thereof, such coatings eliminating necessity for expensive finishing operations and permitting efficient practice of the more economical production procedures.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention reference should be had to the following detailed description taken in connection with the accompanying drawings, in which:

Fig. 2 is a transverse section, with parts broken away, taken substantially on line 2—2 of Fig. 1;

Fig. 3 is an enlarged elevational transverse section, with parts broken away, taken substantially on line 3—3 of Fig. 1;

Fig. 4 is a sectional view similar to Fig. 3 taken on line 4—4 of Fig. 1;

Fig. 5 is an enlarged detailed plan view, with parts broken away and in section, of a portion of endless conveyer means and article holding devices used in the apparatus of Figs. 1 to 4 inclusive, with the articles being sectioned on a line 5—5 indicated in Fig. 6;

Fig. 6 is a sectional view taken substantially on line 6—6 of Fig. 5, showing in side elevation scissors carried thereby the loop handles of which are to be cushion coated by the present method;

Fig. 7 is a transverse section, with parts shown in elevation and others broken away, taken substantially on line 7—7 of Fig. 6;

Fig. 8 is a longitudinal section similar to a portion of Fig. 6, but with the scissors shown inverted as the conveyer travels along a run different from that indicated in Fig. 6 and after the loop handles have been dip-coated with plastisol prior to foaming or blowing of the latter;

Fig. 9 is an enlarged side view of one of the loop handles of the scissors shown in Fig. 8, depicting in cross section the foamed base layer of plastisol coating thereon after the latter has been blown and indicating in section the integral plastisol surface skin of the coating;

Fig. 10 is a plan view of an article different from the scissors indicated in Figs. 1 to 8 inclusive which may be provided with a similar handle coating by the procedure of the present invention; and Fig. 11 is a plan view of still another article which may be improved by practice of the present invention, with a portion of the cushion coating broken away and sectioned.

Figure 1:
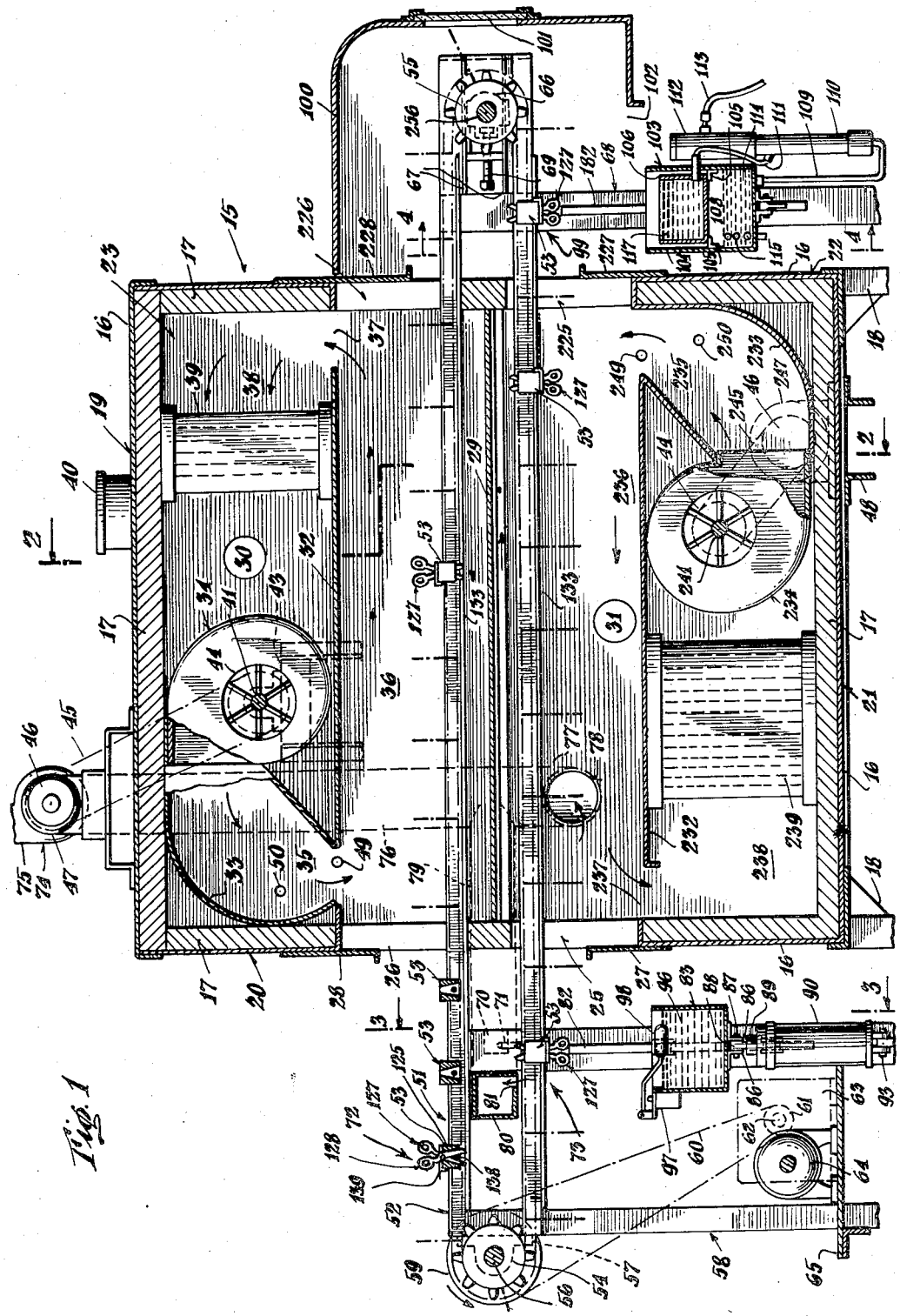
Fig. 1 is an elevational longitudinal section, with parts broken away and others shown in elevation, of an apparatus which may be employed to advantage in practice of the method of the present invention.

Referring to the drawings in which like numerals identify similar parts throughout, it will be seen that an apparatus suitable for practicing the method of the present invention in a continuous manner may include a main cabinet structure 15 having a casing 16 suitably lined with layers of insulating material 17 and supported upon suitable substructure or standards 18—18. The cabinet 15 has a top wall 19, a front end wall 20, a bottom wall 21, a back end wall 22 and opposed side walls 23 and 24. The front end wall 20 is provided with a suitable lower inlet opening 25 and an upper discharge opening 26, and the back end wall 22 is provided with similar lower discharge and upper inlet openings 225 and 226 respectively, with each of these openings suitably fitted with similar upwardly and downwardly sliding pairs of gates 27, 28 and 227, 228 which may be adjusted in position to limit the effective sizes of the openings as may be dictated by the size of the articles to be coated and passed therethrough.

The chamber defined by the cabinet 15 is subdivided by a transverse partition plate 29 to separate an upper compartment 30 from a lower compartment 31. The lower inlet opening 25 in the front end wall 20 and the lower discharge opening 225 in the back end wall 22 communicate with the lower compartment 31 while the upper discharge opening 26 in the front end wall and the upper inlet opening 226 in the back end wall communicate with the upper compartment 30. The upper compartment 30 is suitably provided with a lateral partition structure 32 and flow plate 33 as to define therein a continuous flow path from a pair of suitable blowers 34, 34 succesively through a curved passage 35, downwardly adjacent the front end wall 20 to a horizontal passage 36, back toward the back end wall 22 and up through an opening 37 in partition 32, and then forward through an upper passage 38 back to the blowers. A suitable source of heat, such as an electrical heater 39, preferably is mounted in the upper passage 38 of the compartment 30 so that heated air will be circulated through the passages thereof by the blowers 34, 34. A terminal box 40 is mounted on the top wall 19 for supply therethrough of electrical power to the heater 39. As will be best seen from Fig. 2, the pair of blowers 34, 34, preferably of a full width multi-blade centrifugal type, have the rotors thereof suitably carried by a cross shaft 41 extended through side walls 23 and 24 and rotatably supported by exterior pillow blocks 42, 42 mounted upon supporting brackets 43, 43. The shaft 41 carries a drive pulley or sheave 44 fixed thereto about which is lapped a drive belt 45, in turn lapped about another drive pulley or sheave 46 driven by an electrical motor 47 mounted upon the top wall 19.

Similarly the lower compartment 31 is provided with a similar lateral partition 232 and another curved flow plate 233 which are mounted therein in an order substantially the reverse of the mounting of partition plate 32 and flow plate 33 in the upper compartment 30. Another pair of blowers 234, 234 are mounted in the lower compartment 31 to drive air through a curved passage 235 adjacent the back end wall 22 and upwardly to a horizontal passage 236, thence to a forward opening 237 in partition plate 232 adjacent the front end wall 20, then downwardly through that opening and back through a lower horizontal passage 238 to the blowers 234, 234 in the lower compartment 31. Another suitable electric heater 239 preferably is mounted in the lower passage 238 of compartment 31 so as to heat the circulated air as it is drawn back to the blowers 234, 234. Cross shaft 241 of the lower pair of blowers 234, 234 is mounted through the side walls 23 and 24 supported by pillow blocks 42, 42 and brackets 43, 43 in the manner of the mounting of shaft 41 for the upper pair of blowers 34, 34. The drive pulley 44 on the shaft 241 of the lower pair of blowers 234, 234 is lapped by an endless belt 245 in turn lapped about another drive pulley 46 of a second electric motor 247 to operate the lower blowers with the latter preferably mounted upon platform means 48 provided by a pair of angles secured to the bottom wall 21 and extending laterally therefrom beyond the side wall 24, as will be seen in Fig. 2. Another terminal box (not shown) for the supply circuit of the heater 239 may be mounted on and supported by the bottom wall 21.

Since the composition of certain baths to be employed in practice of certain embodiments of the method of the present invention by operation of the apparatus shown in the drawings as well as thicknesses of applied coatings will, as explained hereinafter, dictate temperatures in the upper and lower compartments 30 and 31, the supply circuits of the heaters 39 and 239 preferably have associated therewith certain temperature controls including temperature control bulbs 49 and 249 respectively located in the flow path at the junctures of passage portions 35 and 235 respectively with lateral passages 36 and 236. As a measure of safety, high temperature limit switches may also be provided, each having associated therewith a control bulb with one located at 50 in the passage portion 35 and the other located at 250 in passage portion 235. These control bulbs are indicated in Fig. 1.

An endless conveyer 51 is extended through from the front end to and through the back end of the cabinet 15 by way of openings 25, 26, 225 and 226, and is provided in the form of a pair of transversely-spaced endless chains 52, 52 of the link type to be sprocket driven and carrying at longitudinally-spaced points transversely-extending flights 53—53. As shown in Fig. 1, each endless chain 52 is lapped about a front driving sprocket 54 and a rear driving sprocket 55. The transversely-spaced pair of front driving sprockets 54, 54 are suitably mounted on and fixed to a cross shaft 56 with each end thereof suitably supported by a pillow block 57 carried by a framework 58 at the front end of the cabinet, so that when the cross shaft is driven both sprockets are rotated thereby. Cross shaft 56 is suitably driven, such as by a drive sprocket and driving chain, which for simplicity have been shown diagrammatically in Fig. 1, and as will be seen from Fig. 3, consists of a driven sprocket 59 fixed on the shaft and an endless chain 60 lapped thereabout and a driving sprocket 61. Driving sprocket 61 is fixed on output shaft 62 of a reduction gear unit 63, suitably driven by an electric motor 64. The reduction gear unit 63 and the motor 64 are supported by a platform 65 mounted on the framework 58, as will be seen from Figs. 1 and 3. The pair of rear endless chain sprockets 55, 55 are also mounted on a cross shaft 256 suitably supported by a pair of floating pillow blocks 66, 66 each slidably carried between a pair of lateral rails 67, 67 supported by a rear framework 68 and with each of these pillow blocks being adjusted in position longitudinally of the apparatus by an adjustment screw 69 in a conventional manner to maintain adjusted tension on the endless chains 52, 52.

The electrical supply circuit of electric motor 64 includes therein a conventional limit switch unit, shown in dotted lines at 70 in the left hand side of Fig. 1, with a control arm thereof 71 located in the path of the flights 53—53 as they travel along the bottom run of the endless conveyer. The limit switch 70 may be utilized periodically to stop travel of the endless conveyer as each flight passes the same so that a corresponding flight will be stopped in an exposed position at the front of the apparatus in the vicinity of station 72 for unloading and loading, and any conventional means, such as a manual starter, may be employed to start the motor 64 after each flight 53 is unloaded and then again loaded at the loading station 72. It will be noted from Fig. 1 that the bottom run of the endless conveyer travels through the lower inlet opening 25 in front end wall 20 to pass through the upper passage 236 of the lower compartment 31 and then out through the outlet opening 225 in the back end wall 22 to expose flight-carried articles at the rear of the cabinet 15 for a certain dipping operation to be explained later. Also, as shown in Fig. 1, the upper run of the endless conveyer 51 extends forward through the inlet upper opening 226 in the back end wall 22 to pass through the lower horizontal passage 36 of the upper compartment 30 and finally through the upper outlet opening 26 in the front end wall 20 to expose the successive flights 53—53 at the unloading and loading station 72.

Since an embodiment of the method of the present invention may include a step of dipping in a priming bath portions of the articles to be coated with foamed plastisol, as explained hereinafter, and the composition of such bath when employed for bonding may include volatile solvents, provision is made for carrying off fumes from such solvents both at a dipping station 73 below the loading station 72 and from the lower heating compartment 31. Such means for carrying off or exhausting volatilized solvents preferably consists of a motor-driven fan 74, which exhausts to a stack 75, and suction conduit 76 having a branch line 77 communicating at 78 with the lower compartment 31 and another branch line 79 connected to a transversely-extending suction head 80 provided with a transversely-extending inlet slot 81 on its lower side in the vicinity of the dipping station 73, all as shown in Figs. 1 and 2. As indicated in Fig. 2, the conduit 76 may be provided with a suitable manually-adjustable damper device 706 to regulate the flow of exhausted fumes therethrough.

As is indicated in Fig. 1 and more clearly shown in Fig. 3, the device to effect dipping at station 73 may be of the following construction. A pair of transversely-spaced vertical rails 82, 82 are suitably supported by framework 58. A dipping tank 83 is carried between transversely-spaced carriage devices 84, 84 each provided with flanged wheels or rollers 85, 85 riding upon one of the rails 82 for vertical up-and-down movement of the tank. A bottom of the tank 83 is fitted with a pair of spaced transversely-extending angles 86, 86 through which a cross pin 87 extends pivotally to connect thereto an eye 88 fixed to the top end of a piston 89. The piston 89 is reciprocatively mounted within a gaseous medium or air cylinder 90 for raising and lowering the piston and the tank therewith. The cylinder 90 is provided with suitable conduits 91 and 92 to supply gaseous fluid or air thereto and to exhaust the same for raising and lowering the piston 89. The cylinder 90 is suitably pivotally connected at 93 for support by a lazy tongs structure 94 suitably pre-adjusted in effective length and mounted upon a transverse member 95 of the framework 58. Thus, when air or other gaseous fluid is let into the cylinder 90 through the duct 91 piston 89 is raised to elevate the dipping tank 83 to the dipping station 73 for immersion of downwardly-extending portions of articles carried by flight 53 stopped thereat into a bath 96 in the tank. The level of the liquid constituting the bath body 96 is suitably maintained by a float valve 97 carrying a float 98 within the tank and with the valve connected in the conventional manner to a supply conduit (not shown) which may lead to an overhead tank for gravity feed of dipping liquid. The dipping time is dictated by the time the dipping tank 83 is held in elevated position by piston 89.

A second dipping station is provided at 99 where the lower run of the endless conveyer 51 emerges from the cabinet 15 on the back side thereof, as is indicated in Fig. 1. At the second dipping station 99 the portions of the lower and upper runs of the endless conveyer 51 exposed beyond the cabinet 15 are hooded over by a suitable hood 100 having a sight window 101 in the back side thereof and with its bottom open at 102 to permit raising and lowering therethrough of dipping tank structure here described in connection with Figs. 1 and 4. The framework 68 supports a pair of vertical transversely-spaced rails 282, 282. A tank structure 103 is carried between carriages 84, 84 like those employed for support of dipping tank 83, being suitably fitted with rollers 85—85 which ride the rails 282, 282. The tank structure 103 consists of an outer tank 104 which supports on internal brackets 105—105 a second smaller dip tank 106 with its bottom 107 at a distance appreciably above the bottom of the outer tank to define below it an outer tank compartment 108. A conduit 109 connects the compartment 108 to the intake of a piston pump 110 with the discharge from the latter being connected by a conduit 111 to the interior of the inner tank 106. Thus, when the pump 110 is operated, liquid in the outer tank compartment 108 is pumped up into the inner tank 106 to keep the latter full with excess overflowing the top edges thereof back down into the outer tank compartment 108. The piston pump 110 is operated by an air cylinder 112 suitably connected by a duct 113 to a source of air supply (not shown). Such pumping and continuous flow maintains the plastisol bath ingredients in well admixed condition. Since it may be desired to keep the body 114 of dipping liquid in the outer tank compartment 108 at a predetermined, adjusted or elevated temperature, such as to assure a consistency which is pumpable and facilitates dipping in the bath 117 in inner tank 106, this compartment is preferably fitted with a suitable heat exchanger 115 having suitable ducts 116 connecting it to a source of cool or heated liquid, such as water (not shown). Thus, the inner tank 106 is kept constantly filled with a body 117 of dipping liquid at uniform temperature, which will be a plastisol composition, to maintain a standard volume thereof in the immersing portion of the tank structure 103.

The dipping tank structure 103 is mounted upon elevating means similar to those employed in connection with the dipping tank 83 and, as will be seen from Fig. 4, it may comprise a like air cylinder 290 having its piston 89 connected by another eye 88 to angles 86 carried by the bottom of the outer tank 104 with the air cylinder suitably supported at 93 upon another lazy tongs structure 294. Preferably, the lazy tongs structure 294 is mounted upon a lever 118 pivotally supported at 119 by a bracket 120 mounted upon a cross member 121 of framework 68. The cross member 121 preferably carries an air cylinder 122 having a piston 123 supporting the free end 124 of the lever 118. Such adjustable support of the lazy tongs 294, on which the air cylinder 290 for raising and lowering the dipping tank structure 103 is mounted, permits rather precise adjustment of the level to which the surface of the body of dipping liquid 117 in the inner tank 106 is to be lifted so as to dictate quite accurately the depth to which articles are to be dipped therein for coating with plastisol composition. Fow control valves (not shown) may be employed in the gas or air supply and/or exhaust lines 91 and 92 to regulate the speed of elevation and lowering of the dipping tank structure 103.

As will be seen in Figs. 1 and 2 and more particularly in Figs. 5 to 8 incl., each flight 53 of the endless conveyer 51 may consist of a cross bar 125 having a plurality of longitudinally-spaced holes or slots 126—126 extending therethrough, preferably rectangularly shaped in cross section and flared or enlarged downwardly when desired for carrying small scissors, such as those illustrated at 127—127, when the loop handles 128, 128 of such scissors are to be coated in accordance with the present invention. Of course, each flight 53 will be designed to accommodate whatever articles are to have portions thereof coated by the method of this invention and the structure thereof, as illustrated in the drawings, is here described by way of example as it has been designed for the coating of scissors handles. The ends of each slotted cross bar 125 are supported by suitable brackets 129, 129, each of which is fastened to one of the endless chains 52 by through pins 130, 130, each carrying a roller 131 disposed between laterally-spaced pairs of side links 132, 132 of the chain. Rollers 131—131 preferably ride on a rail 133, a pair of which are mounted horizontally in the horizontal passage 36 of the upper compartment 30 to guide the top run of the endless conveyer 51, and another pair of which are mounted in similar fashion in the horizontal passage 236 of the bottom compartment 31 for a like purpose with respect to the lower conveyer run. Each of the holes or slots 126 in the transverse flight bar 125 is preferably of such width as to receive through the top smaller end thereof the two lapped blades 134, 134 of a pair of scissors 127 and the heads of the pivot pin 135 extending therethrough.

Each flight bar bracket 129 also preferably carries a downwardly-extending post 136 to or about a pair of which for each flight 53 are attached or looped ends or terminal eyelets 137, 137 of a transverse rod or wire strand 138. As a result, when the blades 134, 134 of a pair of scissors 127 in relatively lapped positions are inserted through one of the slots 126 in flight bar 125 and, as their noses approach the wire 138, they are pivoted away from each other or spread apart, they will receive between their cutting edges the wire 138 suitably to hold them in spread-apart relative positions as indicated in Fig. 6. Thus wire 138 may tend to retain the pair of scissors 127 on the flight bar and, more particularly, holds the looped handles 128, 128 of the scissors spread apart in the relative positions depicted in Fig. 6 so that when they are dip-coated, coating material will not tend to bridge across from one to the other.

Each flight bar 125 is provided with an elongated holding or locking plate 139 preferably in the form of an angle having a top flange 140 provided with a series of longitudinally-spaced notches 141—141 alignable with the slots 126—126. Thus, after a plurality of the scissors 127—127 are mounted in the slots 126—126 of the slotted flight bar 125, as indicated in the right side of Fig. 5, the locking plate 139 may be moved laterally in the direction of the arrow 142 so that its slotted top flange 140 moves transversely across the top of the flight bar with each slot 141 receiving therebetween one of the pairs of scissors blades 134, 134 above the projecting heads of their transverse pivot pin 135. As a result, the locking plate 139 securely holds the plurality of scissors 127—127 in the plurality of flight bar slots 126—126 when suitable means are provided for holding the locking plate on the flight bar. Such holding means may be provided in the form of a pair of permanent magnets 143, 143 inset in the top faces of the opposite ends of the flight bar 125, as will be understood from Figs. 5 and 7. Thus, the locking plate 139 should be of paramagnetic material, such as sheet steel, with the pair of magnets 143, 143 securely holding its ends snugly against the top surface of the flight bar 125 with limited force so that the locking plate may be readily pried or pulled off for unloading from the slotted flight bar the series of scissors 127—127 after dip-coating the handles 128—128 thereof.

In operation of the apparatus depicted in Figs. 1 to 8 incl., in practice of an embodiment of the method of the present invention, an operator will stand at the loading and unloading station 72 where one of the flights 53 is located with the endless conveyer stopped. The operator will load a series of scissors 127—127 in the slots 126—126 of the flight bar 125 at this station in the manner described above in connection with Figs. 5 to 7 incl. and then apply the locking plate 139 in the indicated manner to hold the scissors on the flight bar with their loop handles 128—128 extending upwardly, as shown in Fig. 1. The operator will then start up the motor 64 to rotate the endless conveyer 51 so that the next following flight 53 is moved forward to the loading and unloading station 72 with carry forward of the loaded flight, the endless chain moving forward the distance between a pair of successive flights. When a plurality of successive flights is so loaded, one will eventually be moved along the lower run of the endless conveyer to the position of the control 70 at the first dipping station 73 so that the handles of one or more of the scissors loaded in a flight bar when moved thereto will strike the control arm 71 to stop the endless conveyer motor 64, permitting unloading and loading of a flight 53 at the loading station 72 and also a dipping operation at dipping station 73. Thereafter, the endless conveyer 51 will move step-by-step with its operation being initiated by a starter button and being stopped with loaded flights located at the stations 72 and 73 by the control 70. It will be noted, particularly from Fig. 1, that after each flight 53 moves forward and then down about the pair of sprockets 54, 54, the plurality of scissors 127—127 will be held therein in inverted positions with their loop handles 128—128 depending. Such manual control of the step-by-step operation of conveyer 51 can be supplemented by automatic timer controls which after the conveyer is set in motion and then periodically stopped, such as by control 70, will start the conveyer automatically as dictated by a predetermined automatic timer cycle.

The plurality of inverted scissors 127—127 thus have their loop handles 128—128 extending downwardly at the dipping station 73 and they may there be treated by the priming composition 96 in the tank 83 as the stopped conveyer holds them still. Air pressure applied to the air cylinder 90 of the dipping mechanism at dipping station 73 raises the dipping tank 83 to immerse the downwardly-extending scissors loop handles 128—128 in the dipping solution. Suitable mechanism (not shown) is provided to apply such air pressure to the tank-raising cylinder 90 and then to bleed it out in such timed relation with operation of the endless conveyer 51 as to assure that the scissors loop handles 128—128 will be dipped into the priming solution in the raised tank 83 for a time sufficient to assure the proper application of a ground coat thereon and the tank will then be lowered to permit the dipped scissors handles to be moved forward along the lower run for the next step or period of motion of the endless conveyer 51.

When the apparatus illustrated in Figs. 1 and 2 is set up for an operational run, the circuits of the heaters 39 and 239 are closed and the fan motors 47 and 247 are energized so that warmed or hot air is circulated through the passages 36 and 236 respectively of the upper and lower compartments 30 and 31. As a consequence, a plurality of the inverted scissors 127—127, after having their loop handles 128—128 dipped in priming solution at the dipping station 73, are carried forward step-by-step along the lower run of the endless conveyer 51 through the passage 236 of the lower compartment 31 with heated air flowing countercurrent therethrough to dry out or evaporate all traces of solvent. At the same time, with the exhaust fan 74 operating, the solvent fumes are carried away from above the dip tank 83 at the dipping station 73 (and thus from the vicinity of the proximate loading station 72) by the slotted elongated nozzle 80 and also by the duct 77 communicating with the lower compartment 31, and the gaseous medium so exhausted from the latter is replaced by fresh air which may flow into the lower chamber 31 through the end wall openings 25 and 225.

Eventually, the flight-supported series of scissors 127—127, having dipped handles with the ground coat thereon thoroughly dried, is moved to the second dipping station 99 where, the scissors as a group are held in inverted suspended position by stoppage of the endless conveyer between periods of forward motion, the dip tank structure 103 is raised by its air cylinder 290. As a result, the inverted loop handles 128—128 of a group of scissors 127—127 at the second dip station 99 are immersed in the bath 117 of plastisol which is carried upwardly by the raised tank structure 103. The scissors loop handles 128—128 are maintained at the second dipping station 99 immersed in the plastisol bath 117 for a predetermined period to assure a coating of proper thickness thereon. As will be explained later, the latent heat in the scissors loop handles 128—128, the consistency of the plastisol bath 117, and the time of dipping or immersion at the second dipping station 99 will determine the thickness of the coating of plastisol applied to the handles. Then the dipping tank structure 103 is lowered to permit the plastisol-coated scissors handles to be moved forward from the dipping station at 99 during the next period of motion of the endless conveyer 51 and to be replaced at that station by the succeeding group of scissors 127—127. In this manner, the loop handles 128, 128 of each pair of scissors 127 are suitably provided with relatively thick coatings, illustrated at 144 in Fig. 8, of unfoamed plastisol. The plastisol composition which constitutes the coatings 144, 144 on the scissors loop handles 128, 128 contains a suitable blowing agent, as will be more fully explained hereinafter, so that the plastisol may be subsequently blown to sponge-like consistency to provide a desirable cushion on the handles.

Each group of plastisol-coated scissors loop handles 128—128 is then carried step-by-step up about the sprockets 55, 55 at the back end of the apparatus and then forward along the top run of the endless conveyer 51 to enter the upper compartment 30 through opening 226, so as to travel through the passage 36 countercurrent to a flow of heated air through the latter. The blowing agent in the plastisol composition applied from the bath 117 is of a nature to release gas when heated to a proper temperature. As a consequence, when the plastisol-coated scissors handles 128—128 are moved step-by-step forward through the compartment 30, the plastisol becomes heated to a temperature to release interiorly thereof from the blowing agent a suitable blowing gas, such as nitrogen, to foam the plastisol and transform the plastisol coating to a sponge-like coating. Blowing of the plastisol coatings in this manner produces on the surfaces thereof substantially liquid-impervious skins which close off the cellular pores at the surfaces of the coatings, and the cellular pores are of a segregated nature or sealed off from each other so that foaming gas will remain entrapped therein. Such coating structure is illustrated in Fig. 9 wherein it is indicated that each sponge-like coat 244, after the blowing operation, consists of a sponge-like cellular base layer 145 covering all exposed surfaces of the loop handle 128 and a substantially liquid-impervious surface skin 146 covering this cellular base layer. It will be noted therein that due to the shape of the grasp portion of the loop handle 128 laterally-projecting means of the latter are located behind at least portions of the foamed coating 244 thereby securely anchoring the same in position. Such mechanical anchorage of the foamed plastisol coating 244 on the grasp portion of the loop handle 128 may be supplemented by the priming or ground coat which was previously applied at the first dipping station 73 if such ground coat is in the nature of a rubber-like adhesive which will securely bond the foamed plastisol material to the surfaces of the grasp portion of the handle. However, if desired, such ground coat, of course, may be omitted, particularly when the shape of the handles grasp portion is such that the foamed plastisol coating cannot slip off in use.

Practice of the method of the present invention is, of course, not limited to the coating of loop handles of scissors and shears and, for example, may be employed to advantage for applying similar coatings 244, 244 to handles 228, 228 of a pair of pliers 227, as illustrated in Fig. 10. Likewise, the handles of other tools or instruments, such as handle 338 of a screw driver 327, may be provided with a similar cushion coating 244, as illustrated in Fig. 11. In the case of the pliers of Fig. 10, since the handles 228, 228 taper toward their tips, it is desirable to use a bonding ground coat applied at the first dipping station 73 securely to bond thereon the cushion coatings 244, 244 while in the case of shaped handles, such as 338 of the screw driver 327 of Fig. 11, portions of the handle to the rear or back of the shank may be so enlarged, as illustrated, that the cushion coating 244 may not readily slip off in use and in such case the bonding ground or primer coat may be omitted.

The appearance of tools and instruments and other articles may be enhanced by coating the handles or other portions thereof with such cushion coatings of plastisol, particularly if there are incorporated in the latter pigments to give them attractive and distinctive colors. For example, the use of such pigments has been found to be of particular advantage in the sale of scissors and shears. The colors are found to be attractive to purchasers and particularly when small scissors are designed for use in schools by children, it is found that the colored coatings have particular appeal. Also, if the coatings of different classes and styles of scissors and shears are made distinctively different, the color distinctions may be relied upon for identification of different scissors and shears in sets designed for different purposes and also to distinguish between those to be sold for different prices.

The sponge-like cushion coatings provided in accordance with the present invention, when employed on the handles of tools and instruments such as scissors and shears, effectively eliminate the usual objection which has been directed to the designs thereof with respect to comfort from the beginning of their introduction. Many shapes and efforts to eliminate discomfort have been tried without complete success and all such efforts have required very careful finishing. This has been particularly true with respect to scissors which are sold to kindergartens and schools for use of children, a common complaint being that the loop handles hurt their hands. The cushion coatings provided by the present invention have eliminated such objections. Also, the use of such cushion coatings makes unnecessary costly finishing procedures. Scissors and shears are manufactured by three generally different methods of forming the blade units of cast iron or by a hot drop forging procedure or by a cold pressed or cold forging method and, of course, the latter procedure is the most economical to mass production. By employing cushion coatings of the present invention it is no longer necessary to grind and carefully to finish the loop handles of such scissors and shears since rough surfaces thereof are covered and cushioned by the present cushion coatings, and thus more economical manufacturing procedures can be employed in the production of such articles.

The primer or ground coat composition constituting the first bath 96 in tank 83 at the first dipping station 73 is such as to give good adhesion between the subsequently-applied plastisol coating and the surfaces of the articles, such as handles of tools and instruments, and to increase resistance to corrosion in case the latter are made of oxidizable metal, such as steel. Thus this primer composition is a rubber-like adhesive containing a solvent, and preferably may be an acrylonitrile-butadiene copolymer dissolved in a suitable ketone solvent, such as methyl ethyl ketone or methyl isobutyl ketone. On heating, such a primer or ground coat composition cross-links to form a film which is highly adherent with respect to both the plastisol coating and metal surfaces covered with the latter. Since polyvinyl chloride, a constituent of the plastisol, adheres strongly to clean steel surfaces, such primer or ground coat may be omitted in the practice of the present invention when the articles or handles to be coated are of steel, such as the steel handles of scissors or shears. In order to assure cleanliness and freedom of the steel surfaces from grease and oil such surfaces should be washed with a suitable cleansing agent, such as in a warm dilute mixture of sodium diphosphate and sodium carbonate for a few minutes, followed by rinsing. Such primer or ground coating, or cleansing of steel surfaces, may be dispensed with if the articles to be coated with sponge plastisol ore either of such physical shape as to prevent slip-off of the blown plastisol coating, as in the case of looped handles of scissors or shears, or are of an inherently clean nature as may result from certain production procedures and formed from material such as steel having an adhering affinity for plastisol ingredients.

The length of time required to dip the articles in the primer or ground coat bath 96 is of no moment and may constitute any practical portion of the interval during which a group of the articles are stationary at the first dipping station 73 as may be dictated by the time which is required for unloading and loading a flight 53 at station 72. The solvent in the primer coat composition may be eliminated by air drying and may be speeded up by forced circulation of air and/or heating, as in lower compartment 31.

Preheating the articles prior to coating with unfoamed plastisol to elevated temperatures, such as during the time they travel through lower compartment 31, not only assures elimination of primer coat solvent but also has a definite bearing on the thickness of the unfoamed plastisol applied by dipping at the second dipping station 99. In some cases where the foamed or sponge plastisol coating may be acceptably thin, relatively speaking, preheating may be such as to adjust the temperature of the articles to relatively low elevated temperatures, such as of an order that at the time the articles are dipped in the bath of plastisol they may be at a temperature as low as about 150° F. The more latent heat in the articles below a certain maximum temperature when dipped in the unfoamed plastisol the thicker will be the coating of the latter as deposited by the dipping, such as at the second dipping station 99. The maximum temperature of such latent heat in the articles to be dipped in the plastisol bath is dictated not only by the requirement that it must not be so high as to be destructive of the plastisol but, more specifically, it should not be so high as to cause appreciable release of gas from the blowing agent in the plastisol composition during the dip-coating. For example, in the dip-coating of articles with plastisol by the use of the apparatus illustrated in the drawings the temperature of the preheating compartment 31 may be maintained at a temperature in a range which assures that the temperature of the articles at the time they are dipped into the plastisol bath will be in the preferred range of about 150° F. up to a temperature approaching the temperature at which blowing gas is released from the blowing agent, such as approaching about 400° F. The period of time during which the articles are subjected to such preheating, such as by travel through the preheating compartment 31, may be governed partly by the time necessary to bring the temperature of the articles up to the predetermined preheat temperature and partly by the time necessary to assure complete elimination of primer coat solvent, and may be of the order of about three to eight minutes. If, for example, a temperature of about 360° F. will release foaming gas from the blowing agent in the plastisol composition it would be preferable that the preheating and whatever cooling which may occur between the preheating and the dipping into the plastisol bath assure the temperature of the preheated articles as they are dipped in the plastisol bath be appreciably less than 360° F., or such that as they are dipped in this cooler bath and lose heat to the latter the temperature to which they are so promptly cooled will be below the blowing temperature. Such precautions in preheating will assure the attainment of the desired thickness of the dip-coat of unfoamed plastisol and permit subsequent controlled foaming or blowing of the latter which assures formation of the cured liquid-impervious surface skin on the foamed or sponge plastisol coating of desired thickness and minimizes possibility of rupture thereof which might occur with too rapid blowing.

The plastisol bath 117 in dipping tank 106 is a viscous fluid composition of an expansible plastisol comprising a dispersion of thermoplastic resin in a plasticizer and containing a blowing agent. Essentially it preferably comprises a polyvinyl chloride base resin which may be a straight polyvinyl chloride or a copolymer of a major amount of vinyl chloride and a minor amount of another vinyl type monomer. For example, the resin ingredient may be a copolymer of vinyl chloride and vinyl acetate derived from 85% to 95% vinyl chloride and 15% to 5% vinyl acetate. The resin ingredient may also be a mixture of other thermoplastic resin and polyvinyl chloride or copolymerized polyvinyl chloride.

The plasticizer in which the resin ingredient is dispersed may be any of those recognized as suitable for use as plasticizer ingredients of plastisols, such as dioctyl phthalate, didecyl phthalate and other high boiling esters, ethers, ketones, etc. The quantity of the plasticizer employed should be such as to assure a fluidity permitting the dip-coating therein of the articles and pumping for circulation in the dipping device 103, such as from about 60 parts thereof per 100 parts of resin to about 300 parts thereof per 100 parts of resin. The amount of plasticizer may be nearer the lower limit of this range or even less if a quantity of suitable solvent promoting fluidity is employed, such as methyl ethyl ketone, methyl isobutyl ketone, xylene or toluene, e. g. 30 parts of methyl ethyl ketone and 20 parts of methyl isobutyl ketone may be mixed with 25 parts of xylene or toluene to form a solvent which may constitute as much as about three quarters of the resin-plasticizer dispersion composition. But in the event that such a solvent is employed in the plastisol bath the upper heating compartment 30 for blowing and curing the plastisol coating should be connected to the exhaust equipment, such as duct 76 and the dipping bath kept cool.

It may be desirable to use in the plastisol dipping composition a known heat or light stabilizer but it will be best to avoid those of the lubricating type since it is desired to avoid any material which may reduce retainment of the finished sponge coatings on the surfaces of the dipped articles. About 1 to 5 parts of tribasic lead sulphate per 100 parts of resin is useful for this purpose. Phenyl salicylate may also be used for this purpose.

The plastisol composition is to be of the expansible type to transform the dip-coat of plastisol to a sponge coating and thus a blowing agent ingredient will be included which upon heating will release a gas. It is preferred to employ such blowing agents as will release nitrogen in the coating when heated since due to the high nitrogen content of the atmosphere there may be less tendency for collapse of the cells by transfer of gas therein to the atmosphere if the cells of the sponge coating are filled with nitrogen. Many known blowing agents are suitable, such as N,N'-dimethyl-N,N'-dinitroso terephthalamide, a',a'-azobisisobutyronitrile, p,p'- oxy bis (benzene sulfonyl hydrazide), diazoaminobenzene, and dinitroso-pentamethylene-tetramine. The range of temperatures in compartment 30 which will release blowing gas therefrom may be about 220° F. to 400° F., and the particular temperature selected will be dictated by the specific blowing agent selected as is known in the plastics industry. The quantity of the blowing agent employed will be dictated by the degree of density and proportion of cellularity or porosity desired since the greater the amount of the blowing agent the greater is the amount of nitrogen released to reduce the density and increase the porosity. For handles and hafts intended for heavy duty service a greater density may be desired while for lighter service a greater porosity and less density may be desired. Also where space is limited, such as in handle loops of small scissors, the acceptable thickness of the sponge coatings is limited and such limitation may be served by limiting the thickness of the applied dip-coat through use of lower temperatures of latent heat in the preheated articles and shorter dipping times as well as by using lesser amounts of blowing agents. If the sponge coating is provided for comfort cushioning of the grip by tender hands, such as children in the case of scissors intended for use in schools, a fairly high degree of porosity for maximum comfort may be desired, which may dictate use of an amount of blowing agent greater than the minimum. Generally from about 10 to 40 parts by weight of blowing agent per 100 parts of resin are suitable.

The use of pigments may be desired to enhance the ornamental effect of the cushion coating and many types of pigments suitable for this purpose are known to the plastisol industry. For example, titanium oxide, carbon black, Lithol Rubine Toner, iron oxide red and iron oxide yellow are a few thereof. Where some transparency or a degree of translucency is desired the coloring pigment may be used alone and in small amounts and should be of such character as to assure the desired characteristic. The degree of opacity may be increased by including an amount of white pigment. Only a few parts of the pigment may be required and it may be ground into resin base material with the use of a small amount of the plasticizer.

If, for example, the loop hafts of handles 128, 128 of small scissors, such as is illustrated at 127, are to be cushion coated for school service, the method of the invention may be practiced in the following manner. Small scissors such as those illustrated in the drawings at 127—127 will be loaded on successive flights 53—53 of the endless conveyor 51 and the speed of the latter adjusted such that the pass through the preheating compartment 31 and blowing compartment 30 will be for durations of about seven minutes. The temperature of the preheat compartment 31 will be adjusted to about 320° F. and that of the blowing compartment 30 to about 360° F. The primer dipping tank 83 will be connected to a supply of primer of an acrylonitrile-butadiene copolymer dissolved in methyl ethyl ketone. The plastisol dipping tank structure at 103 will be charged with a viscous fluid bath like or similar to the following composition:

| Ingredient: | Parts by weight |
| --- | --- |
| Polyvinyl chloride | 100 |
| Dioctyl phthalate | 180 |
| Dinitroso-pentamethylene-tetramine | 17 |
| Tribasic lead sulphate | 1 |
| Iron oxide red | 2 |

Cool water at the temperature of the cold water supply system is circulated through the heat exchanger piping 115 to keep the plastisol bath from unduly heating up due to the proximity to the chamber 23 and compartment outlet 225, as well as to latent heat in the conveyor 51 and the scissors 127—127 carried thereby through the preheating compartment 31. Excessive heating up of the plastisol dipping bath 117 causes it to foam and to skin over which deleteriously affect the application of the plastisol dip-coatings and the effectiveness of such coating and the subsequent blowing. In order further to protect the plastisol dipping bath 117 from the deleterious effects of heat from compartment 31 the rear lower door 227 is designed to slide up between the two side chains 52, 52 of the endless conveyor 51, intermediate successive flights 53, 53, when the endless conveyor is stopped for the dipping operation, so as to close most of the outlet opening 225 and shield the raised dipping tank structure 103 from heat radiating from the preheating compartment. Apparatus (not shown) will in timed relation to the step-by-step operation of the conveyor 51 raise this rear door 227 just after the conveyor comes to a stop and lower it just before the conveyor starts up again.

The loop handles or hafts 128, 128 of each pair of scissors 127 will be dipped in the primer bath by raising and lowering tank 83 at station 73, in about a second or so ("in and right out"), and then be carried step-by-step through the preheating compartment 31 during a period of about seven minutes to vaporize and carry away (through exhaust duct 76) the primer solvent and to preheat the scissors and their handles to a temperature approaching 320° F. Then at dipping station 99 the preheated handles 128, 128 will be dipped into the cool unfoamed and circulating plastisol bath 117 by raising plastisol dipping tank structure 103, where immersion will be maintained for about thirty seconds. As previously proposed flow control valves in the flow ducts 91 and 92, leading to and from the elevating and lowering cylinder 290 for dipping tank structure 103 may be employed to advantage to control the rate of travel of the latter. It is important that the rate of withdrawal of the dip-coated articles from plastisol bath 117 be such as to minimize or eliminate formation of drip teats of plastisol at the bottom portions of the dipped articles from both esthetic and structural points of view. Upon lowering of the plastisol dipping device 103 the scissors 127—127 with their dip-coated handles or hafts will then be inverted and carried back through blowing compartment 30 where the coating is subjected to a temperature of about 360° F. during a period of about seven minutes in step-by-step traverse through the blowing compartment to release nitrogen gas in the dip-coats and blow them up to sponge-like cushion coatings with simultaneous heat-curing of substantially liquid-impervious skins on the cushion coatings. Further details of the procedure as carried out by the apparatus illustrated in the drawings are described above.

It will thus be seen that the objects set forth above, among those made apparent from the preceding description, are efficiently attained and, since certain changes may be made in carrying out the above method and in the article set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of applying to metallic manual handles a spongy cushion coating having a substantially liquid-impervious surface skin, comprising the steps of applying heat to such a metallic handle to adjust its temperature at a time of dipping to an elevated temperature below the temperature at which appreciable gas is released from a blowing agent incorporated in a plastisol bath in which said handles are to be dipped, immersing said preheated article handle by dipping in a viscous fluid bath of an expansible plastisol dispersion of thermoplastic resin in plasticizer and containing a blowing agent which releases a gas upon being heated to a certain temperature, the temperature of such preheated handle at the time of dipping it into the plastisol bath being below the gas-releasing temperature, such immersion of said preheated metallic handle in the plastisol bath being for a predetermined period of time which provides a coating of the unexpanded plastisol of desired thickness on the handle, and heating the coated handle to an elevated temperature which releases gas from the blowing agent thereby foaming the plastisol coating, said heating to foam the plastisol curing the surface of the foamed plastisol coating to a substantially liquid-impervious skin.

2. A method of applying to metal manual handles a spongy cushion coating having a substantially liquid-impervious surface skin, comprising the steps of preheating such a metal handle to elevate its temperature to one in the range of about 150° F. to about but below 400° F., providing a coating of unexpanded plastisol on the preheated handle by dipping it in a viscous fluid bath of an expansible plastisol dispersion of thermoplastic resin in plasticizer and containing a blowing agent which releases nitrogen upon heating to an elevated blowing temperature of at least about 220° F. and above the temperature of the handle being dip-coated, the temperature of said pre-heated handle at the time of dipping being below said blowing temperature thereby avoiding generation of nitrogen gas when the preheated handle is dipped into the plastisol bath, heating the coated handle to raise the temperature of the coating to said blowing temperature to release nitrogen from the blowing agent in the coating of unexpanded plastisol thereby foaming and expanding the latter, and heat-curing to form a substantially liquid-impervious skin on the surface of the expanded plastisol coating simultaneously with said foaming thereof by heat.

3. A sponge-coated metallic manual handle comprising, in combination a metallic handle member, a dip-coat of a foamed and cured plastisol dispersion comprising vinyl resin in plasticizer covering surfaces of said handle member, said dip-coat comprising a sponge-like cellular layer of the plastisol covering said handle member and a substantially liquid-impervious heat-cured surface skin of the plastisol integral with and covering said cellular layer, and means anchoring said dip-coat on said handle member.

4. A pair of scissors, shears or the like, having metallic handles provided with looped portions cushion coated with a two-layer dip-coat of foamed and cured vinyl resin dispersion plastisol, an inner layer of said coat being of sponge construction and an outer layer of said coat constituting an integral substantially liquid-impervious, smooth heat cured surface skin continuous with said inner layer, said foamed and cured dip-coat covering the looped portions of said handles whereby the latter physically secure said dip-coat thereto as a result of the loop shape of said portions.

References Cited in the file of this patent

UNITED STATES PATENTS

| | | |
|---|---|---|
| 2,550,232 | Donnell | Apr. 24, 1951 |
| 2,634,243 | Glenn | Apr. 7, 1953 |
| 2,776,265 | Fuller | Jan. 1, 1957 |

OTHER REFERENCES

"Chemical Eng.," December 1952, vol. 59, No. 12, pages 232 and 260–2.5.

"British Plastics," April 1948, page 76.

UNITED STATES PATENT OFFICE
CERTIFICATE OF CORRECTION

Patent No. 2,853,400                                         September 23, 1958

Fred E. Ahlbin

It is hereby certified that error appears in the printed specification of the above numbered patent requiring correction and that the said Letters Patent should read as corrected below.

Column 6, line 15, for "Fow" read -- Flow --; column 9, line 22, for "handles" read -- handle --; column 10, line 4, after "invention" insert a comma; line 37, for "ore" read -- are --; column 14, line 19, strike out "article"; line 74, after "smooth" insert a comma; column 16, under "OTHER REFERENCES", line 6, for "pages 232 and 260-2.5" read -- pages 232 and 234 --; line 7, for "page 76" read -- pages 167-171 --; line 8, add -- "Rubber Age", October 1952, page 76 --.

Signed and sealed this 16th day of December 1958.

(SEAL)
Attest:

KARL H. AXLINE                                                 ROBERT C. WATSON

Attesting Officer                                       Commissioner of Patents